(12) United States Patent
Wakashiro

(10) Patent No.: US 6,539,330 B2
(45) Date of Patent: Mar. 25, 2003

(54) METHOD AND APPARATUS FOR MEASURING 3-D INFORMATION

(75) Inventor: Shigeru Wakashiro, Tokyo (JP)

(73) Assignee: PENTAX Corporation, Tokyo (JP)

( * ) Notice: Subject to any disclaimer, the term of this patent is extended or adjusted under 35 U.S.C. 154(b) by 75 days.

(21) Appl. No.: 09/903,664

(22) Filed: Jul. 13, 2001

(65) Prior Publication Data

US 2002/0029127 A1 Mar. 7, 2002

(30) Foreign Application Priority Data

Jul. 19, 2000 (JP) ........................................ 2000-218608

(51) Int. Cl.⁷ .............................................. G01C 11/00
(52) U.S. Cl. ...................... 702/152; 702/42; 356/620; 382/103; 382/154
(58) Field of Search ................... 702/152, 42; 382/103, 382/106, 154, 141, 285; 356/620; 345/419, 420, 423

(56) References Cited

U.S. PATENT DOCUMENTS 6,144,761 A  11/2000 Kaneko et al. ............. 382/154
6,304,669 B1 * 10/2001 Kaneko et al. ............. 382/154

FOREIGN PATENT DOCUMENTS

| JP | 6-29695 | 4/1994 | |
| JP | 11223526 | * 8/1999 | ........... G01C/11/06 |

* cited by examiner

Primary Examiner—Kamini Shah
(74) Attorney, Agent, or Firm—Greenblum & Bernstein, P.L.C.

(57) ABSTRACT

An apparatus for measuring three-dimension information of an object has an image reader, a corresponding point detector and a three-dimension information calculator. The image reader reads a pair of images recorded in a recording medium in the apparatus. Note that, the object is cylindrical and a pair of occluding contours is reflected in each of the pair of images. The corresponding point detector detects at least one pair of corresponding points, which is an imaginary pair of images of at least one measuring point positioned on a central axis, on a pair of bisecting lines. The three-dimension information calculator calculates the three-dimension position of the at least one measuring point on the basis of the at least one pair of corresponding points by applying a triangulation method.

7 Claims, 15 Drawing Sheets

METHOD AND APPARATUS FOR MEASURING 3-D INFORMATION

BACKGROUND OF THE INVENTION

1. Field of the Invention

The present invention relates to a method and apparatus for measuring 3-D (Three-Dimension) information of an object from a pair of object images, which is obtained by capturing the object from two different directions.

2. Description of the Related Art

A "stereo", or so called "binocular vision" is known as a method for measuring 3-D information of an object, such as position and form, from images. According to the stereo method, the object is captured from two different directions so that a pair of images is obtained. Then, a pair of corresponding points, each of which is an image of one point of the 3-D object, is obtained from the pair of images. Based on the pair of corresponding points and the distance between two capturing points, the position of the object is calculated using triangulation. The stereo method is, for example, utilized for photogrammetry, such as aerial photogrammetry and photogrammetry for a traffic accident spot.

When calculating the position of the object, it is important to detect the pair of corresponding points correctly. This corresponding points determining problem has been an important technical problem in the stereo method and various ways to overcome it have been proposed.

Among some of the ways is a way that detects the pair of corresponding points on the basis of a specific portion of the object, such as an edge or a ridge-line. However, when the shape of the object is a curved surface, such as a cylinder, as the specific portion on the object cannot be easily identified, incorrect corresponding points are detected, or the corresponding points cannot be detected. Consequently, the actual 3-D information of the object cannot be obtained.

SUMMARY OF THE INVENTION

Therefore, an object of the present invention is to provide a method and apparatus for correctly detecting a pair of corresponding points and measuring 3-D information of the object when an object has a curved surface.

An apparatus for measuring three-dimension information of an object according to the present invention has an image reader, a corresponding point detector, and a three-dimension information calculator. This apparatus is applied for photogrammetry, or computer vision in the AI (Artificial Intelligence) field. For example, in the case of photogrammetry for a traffic accident spot, an exclusive still camera with an image sensor is used. The camera is arranged at two capturing points in order to capture the object from two directions. The object to be captured is cylindrical, in other words, the object is a body of revolution. The object has substantially rotational symmetry with respect to a central axis of the object, and a given cross-section perpendicular to the central axis is a circle. For example, the object is a cylinder-shaped object or a frustum-shaped object and so on. When the object is captured, the image reader reads a pair of images recorded in a recording medium. For example, in the case of photogrammetry, the pair of images is recorded in a memory card detachably installed in the camera and apparatus. When the memory card is installed in the apparatus, the pair of images is read from the recording medium and is then temporarily stored in a memory, such as a RAM (Random Access Memory), by the image reader. The pair of images is obtained by capturing the object from two capturing points such that apair of contour lines, called "occluding contours" is reflected in each pair of images.

The object image in each of the obtained pair of images has line symmetry with respect to an imaginary projected image of the central axis, which bisects the object image. According to the apparatus, the corresponding point detector detects at least one pair of corresponding points on a pair of bisecting lines defined in the pair of images. The pair of corresponding points is an imaginary pair of images of a measuring point positioned on the central axis, and the pair of corresponding points is uniquely determined in the pair of images. Each of the pair of bisecting lines is an imaginary projected image of the central axis. The three-dimension information calculator calculates a three-dimension position of the at least one measuring point on the basis of the at least one pair of corresponding points. To calculate the three-dimension information, a triangulation method is applied.

According to the present invention, the imaginary pair of bisecting lines is defined, and then at least one pair of corresponding points is detected on the pair of bisecting lines. Consequently, the pair of corresponding points is detected correctly and 3-D information of the object is obtained correctly.

To detect the at least one pair of corresponding points correctly, preferably, an epipolar line, which is used in the photogrammetry or in the computer vision, is defined. The corresponding point detector defines at least one first image point on one of the pair of bisecting lines in one of the pair of images, and sets at least one epipolar line, corresponding to the at least one first image point, in the other image of the pair of images. Then, the corresponding point detector defines at least one second image point, which is a crossing point of the other of the pair of bisecting lines and the at least one epipolar line. The at least one first image point and the at least one second image point is defined as the at least one pair of corresponding points.

In the case of the photogrammetry, usually, an operator performs a given process for calculating the 3-D information using peripheral equipment, such as a keyboard or mouse. To calculating the 3-D information with the support of an operator, preferably, the apparatus includes a display and an indicating point inputting device. When the pair of images is read from the recording medium, the pair of images is displayed on the display. The indicating point inputting device is operated for inputting two pairs of indicating points on the pair of occluding contours in each of the pair of images. The corresponding point detector detects the two pairs of indicating points input by the operator, and calculates the pair of bisecting lines and the at least one pair of corresponding points in accordance with the two pairs of indicating points in each of the pair of images. In this case, the at least one pair of corresponding points is not automatically detected by a given image-processing method, such as an edge detecting process, but detected on the basis of the input points.

To measure a radius of the object with the 3-D position, preferably, the apparatus includes a radius calculator. In this case, the corresponding point detector detects two pairs of corresponding points, and the three-dimension information calculator calculates the positions of two measuring points on the basis of the two pair of corresponding points. The radius calculator firstly calculates a plane, in which a vector, perpendicular to the central axis and passing one of the two capturing points, is a normal vector and the central axis is included, from the positions of the two measuring points.

Next, the radius calculator calculates an edge point, which is on the plane and a curved surface of the object, on the basis of an image point. The position along the central axis with respect to the edge point is the same as the position of one of the two measuring points. The image point is on one of the pair of occluding contours and corresponds to the edge point. Then, the radius calculator calculates a radius from the edge point and one of the two measuring points.

According to another aspect of the present invention, a method for measuring three-dimension information of an object includes steps of: 1) reading a pair of images recorded in a recording medium, the pair of images being obtained by capturing the object from two capturing points, the object being cylindrical, a pair of occluding contours being reflected in each of the pair of images; 2) detecting at least one pair of corresponding points, which is an imaginary pair of images of at least one measuring point positioned on the central axis and is uniquely determined in the pair of images, on a pair of bisecting lines defined in the pair of images, each pair of bisecting lines being imaginary projected image of the central axis; 3) calculating a three-dimension position of the at least one measuring point on the basis of the at least one pair of corresponding points by applying a triangulation method.

According to another aspect of the present invention, a memory medium that stores a program for measuring three-dimension information of an object. The program includes steps of: 1) reading a pair of images recorded in a recording medium in the apparatus, the pair of images being obtained by capturing the object from two capturing points, the object being cylindrical, a pair of occluding contours being reflected in each of the pair of images; 2) detecting at least one pair of corresponding points, which is an imaginary pair of images of at least one measuring point positioned on the central axis and is uniquely determined in the pair of images, on a pair of bisecting lines defined in the pair of images, each of the pair of bisecting lines being imaginary projected image of the central axis; 3) calculating a three-dimension position of the at least one measuring point on the basis of the at least one pair of corresponding points by applying a triangulation method.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
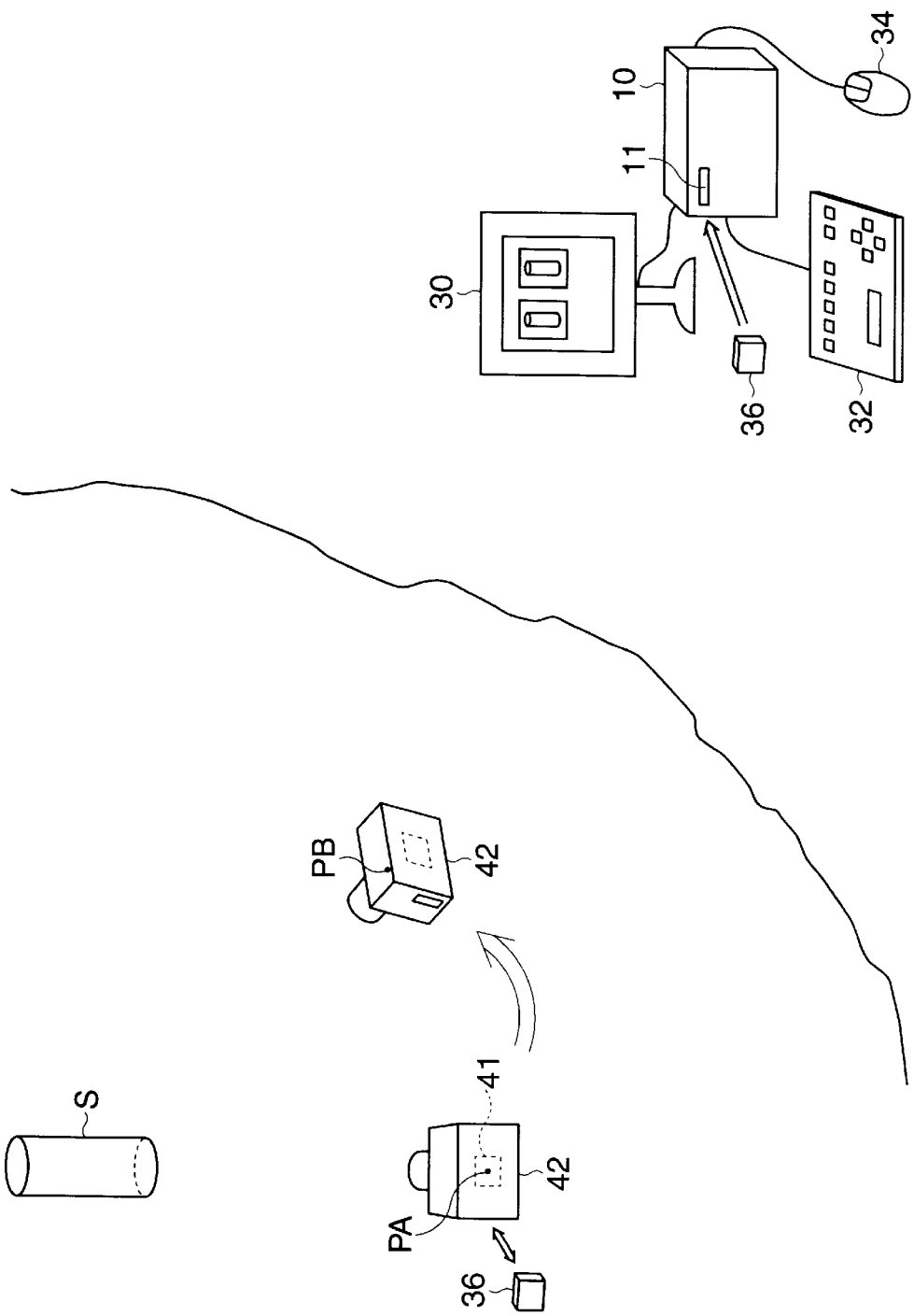
FIG. 1 is a view showing a camera, an object, image information processor, and peripheral equipments.

FIG. 1 is a schematic view showing a camera for photogrammetry, an image information processor for calculating 3-D (three-dimension) information of an object, and peripheral equipment.

In this embodiment, an object S is a cylinder and a camera is used for photogrammetry. Firstly, the camera 42 is arranged at a first capturing point PA and the object S is captured by the camera 42 so that an image including an object image is obtained. At this time, the object is captured such that a pair of occluding contours, which is a pair of contour line images, is reflected or projected in the image. Secondly, the camera 42 is arranged at a second capturing point PB and the object S is captured, similarly to the first capturing point PA. Consequently, a pair of images is obtained. Note that, a center of the camera 42, namely, a lens-center of the camera 42 is positioned at the capturing points PA and PB respectively. Further, capturing data including a distance between the capturing points PA and PB, is recorded in the memory card 36 when capturing the object S.

The camera 42 is a digital still camera with a CCD 41 (Charge-Coupled Device). The pair of object images, which is formed on the CCD 41 via a lens (not shown) at the first and second capturing points PA and PB, are recorded in a memory card 36 in the camera 42, respectively. The memory card 36 is an auxiliary memory device, which is detachably installed in the camera 42. When the memory card 36 is installed in the card slot 11 of the image information processor 10, the pair of images and the capturing data are read from the memory card 36. Herein, the memory card 36 is a compact flash memory. After the capturing is finished, the image information processor 10 is used for calculating 3-D information of the object S.

The image information processor 10 calculates 3-D information of the object S, and a monitor 30, a keyboard 32, and a mouse 34 are connected to the image information processor 10. A card slot 11 is provided on the image information processor 10, the memory card 36 is detached from the camera 42 and then installed in the card slot 11.

When a keyboard 32 is operated by an operator, the pair of images is displayed on the monitor 30. Further, the mouse 34 is operated such that the 3-D information of the object S is obtained.

Figure 2:
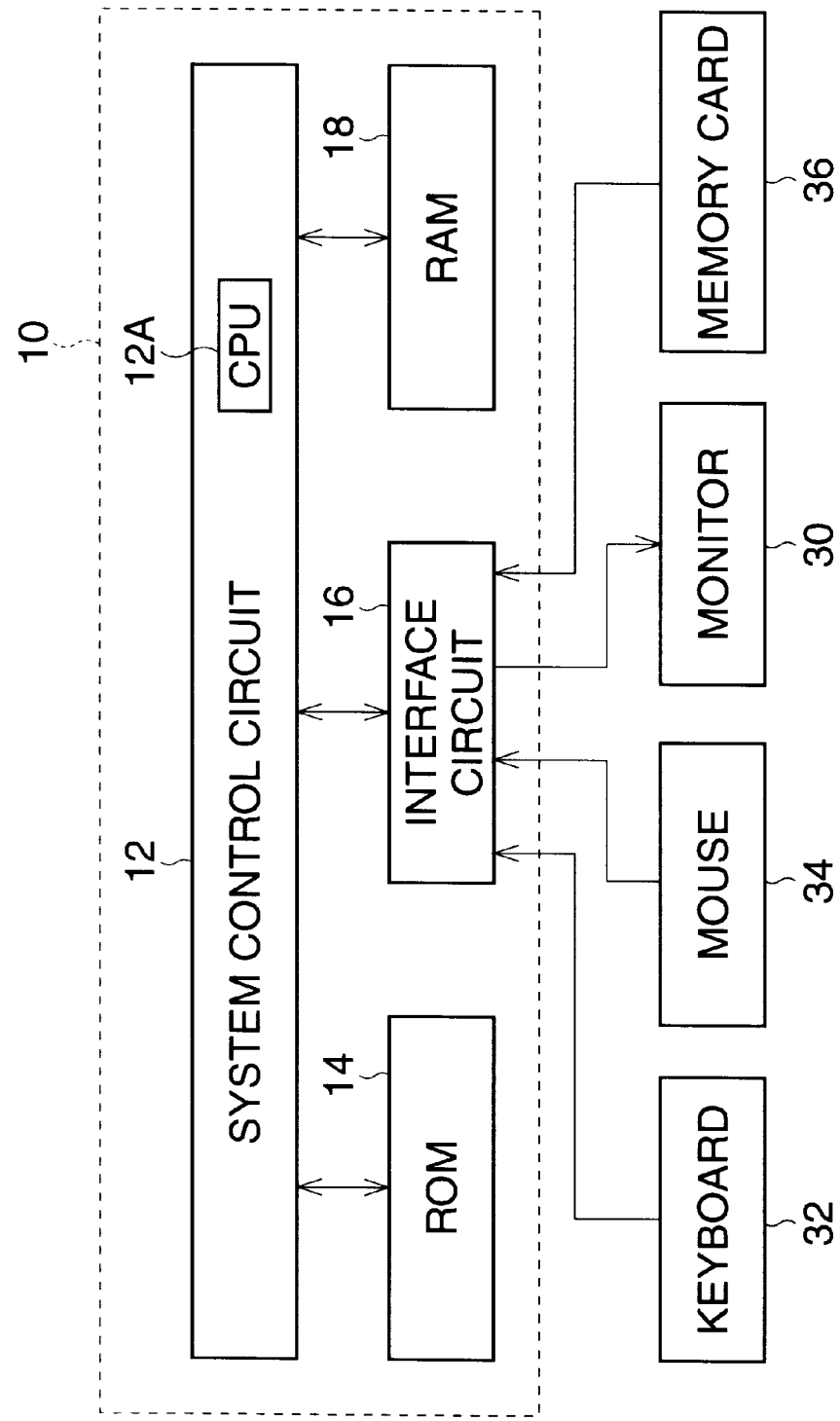
FIG. 2 is a block diagram of the image information processor and peripheral equipment.

FIG. 2 is a block diagram of the image information processor 10 and peripheral equipment.

A system control circuit 12 including a CPU (Central Processing Unit) 12A controls the image processor 10 and performs a calculation of the 3-D information associated with the object S. A program for calculating the 3-D information is stored in a ROM 14 in advance. A signal transmission between the system control circuit 12 and peripheral equipment, namely, the monitor 30, the keyboard 32, the mouse 34, and the memory card 36, are performed via an interface circuit 16.

As described above, when the memory card 36 is installed into the card slot 11, the pair of images and the capturing data are read from the memory card 36 and are temporarily stored in a RAM 18 via the interface circuit 16 and the system control circuit 12. The keyboard 32 is operated to display the pair of object images, thus the pair of images is read from the RAM 18 and is subjected to various processes so that the image signals (video signals) for displaying the object image are generated at an image processing circuit (not shown) in the system control circuit 12. The image signals are fed to the monitor 30 via the interface circuit 16, thus the pair of images are displayed on the monitor 30. The mouse 34 is operated to calculate the 3-D information of the object S, and the process for calculating the 3-D information is performed by the CPU 12A in accordance with input information. The calculated 3-D information is displayed on the monitor 30 and is temporarily stored in the RAM 18.

Figure 3:
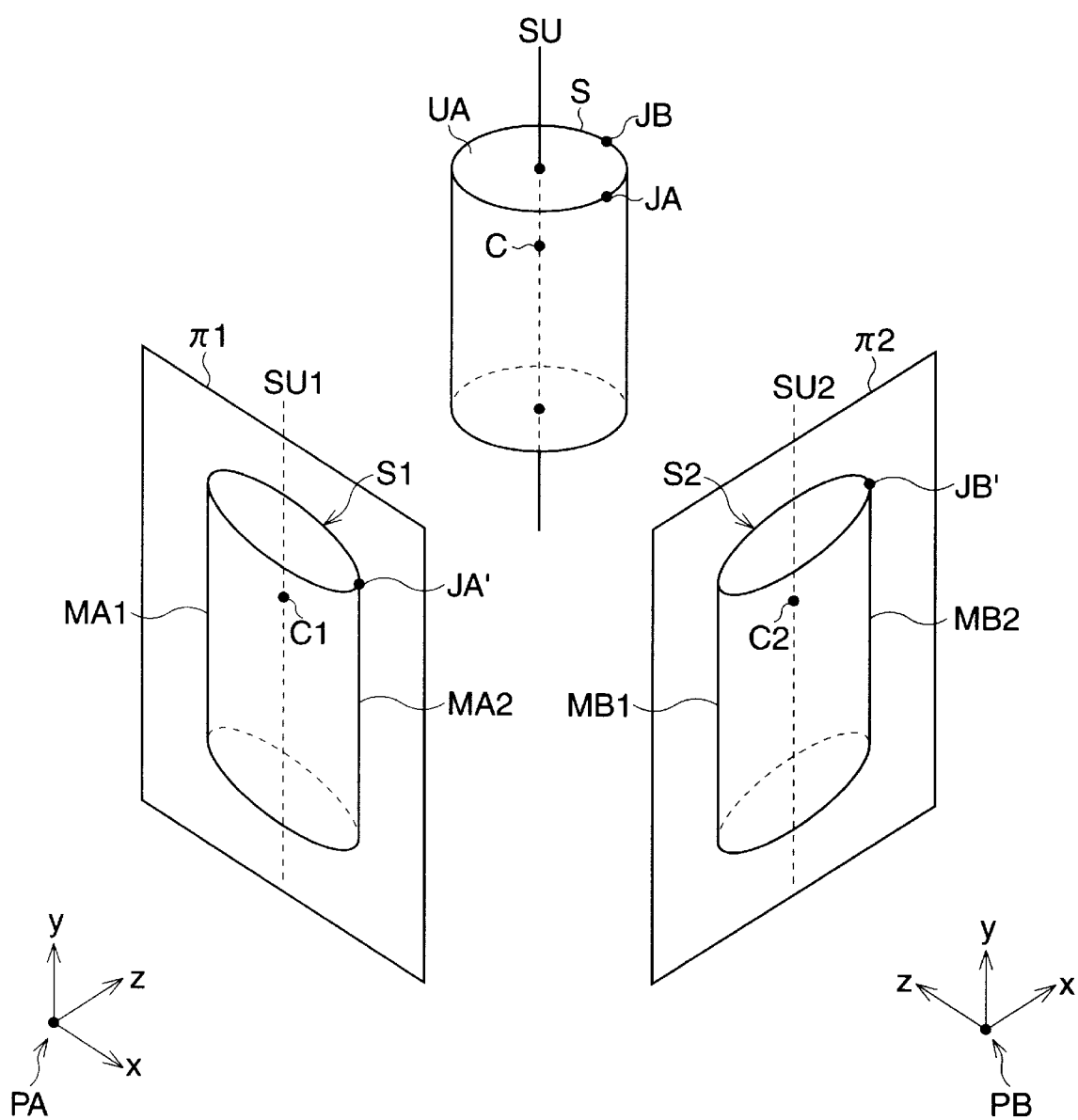
FIG. 3 is a view showing a pair of projected images.

FIG. 3 is a view showing an object S and the pair of object images.

Herein, an image, in which the object image corresponding to the first capturing point PA is included, is represented as "π1" and an image, in which the object image corresponding to the second capturing point PB is included, is represented by "π2". In the image π1, a pair of contour line images of the object image S1 is represented by "MA1" and "MA2". On the other hand, a pair of contour line images of the object image S2 in the image π2 is represented by "MB1" and "MB2". The contour line images are called occluding contours in the stereo field. Further, the object images of the first and second capturing points PA and PB are represented by "S1" and "S2" respectively.

As well known, to calculate the 3-D position of the object S, a pair of corresponding points should be detected. Each of the corresponding points corresponds to an image of one point of the object S. When an outer surface of an object is a curved surface, it is difficult to correctly determine the pair of corresponding points from the pair of captured images. For example, as for a point JA, which is on a circumference of an upper surface UA, an image point JA' of the point JA is on the contour line MA2 in the image π1. On the other hand, in the image π2, an image point JB' of a point JB, which is on the circumference, is on the contour line MB2. Though the point JA is different from the point JB, the image point JA' is on the contour lines MA2 and the image point JB' is on the contour line MB2. Therefore, when determining the image points JA' and JB' as the pair of corresponding points, incorrect 3-D information is calculated.

The object S is cylindrical and has rotational symmetry with respect to a central axis SU of the object S. Therefore, considering imaginary projected images of the central axis SU in the images π1, π2 (actually these image is not represented), the object images S1 and S2 become line symmetry images with respect to imaginary central axis images respectively. Herein, the central axis image in the image π1 is represented by "SU1" and the central axis image in the image π2 is represented by "SU2". As the object S is a cylinder, the pair of contour lines, or the pair of occluding contours MA1 and MA2 is parallel to the central axis image SU1 and the object image S1 is bisected by the central axis image SU1. The object image S2 is also bisected by the central axis image SU2. Therefore, as shown in FIG. 3, image points "C1" and "C2" in the images π1 and π2, which are imaginary images of a point "C" on the central axis SU, are on the central axis images SU1 and SU2, respectively.

Further, also as for any other position except for the first and second capturing points PA and PB, an obtained object image has line symmetry with respect to a projected image of the central axis SU, which bisects the obtained object image. Accordingly, in this embodiment, a given point on the central axis SU is defined as a measuring point having 3-D information of the object S. In this embodiment, a 3-D position of the object S is expressed by the position of the measuring point. For the measuring point on the central axis SU, the pair of corresponding points on the central axis images SU1 and SU2 are uniquely detected. Therefore, the measuring point can be obtained from the pair corresponding points by applying a triangulation.

Figure 4:
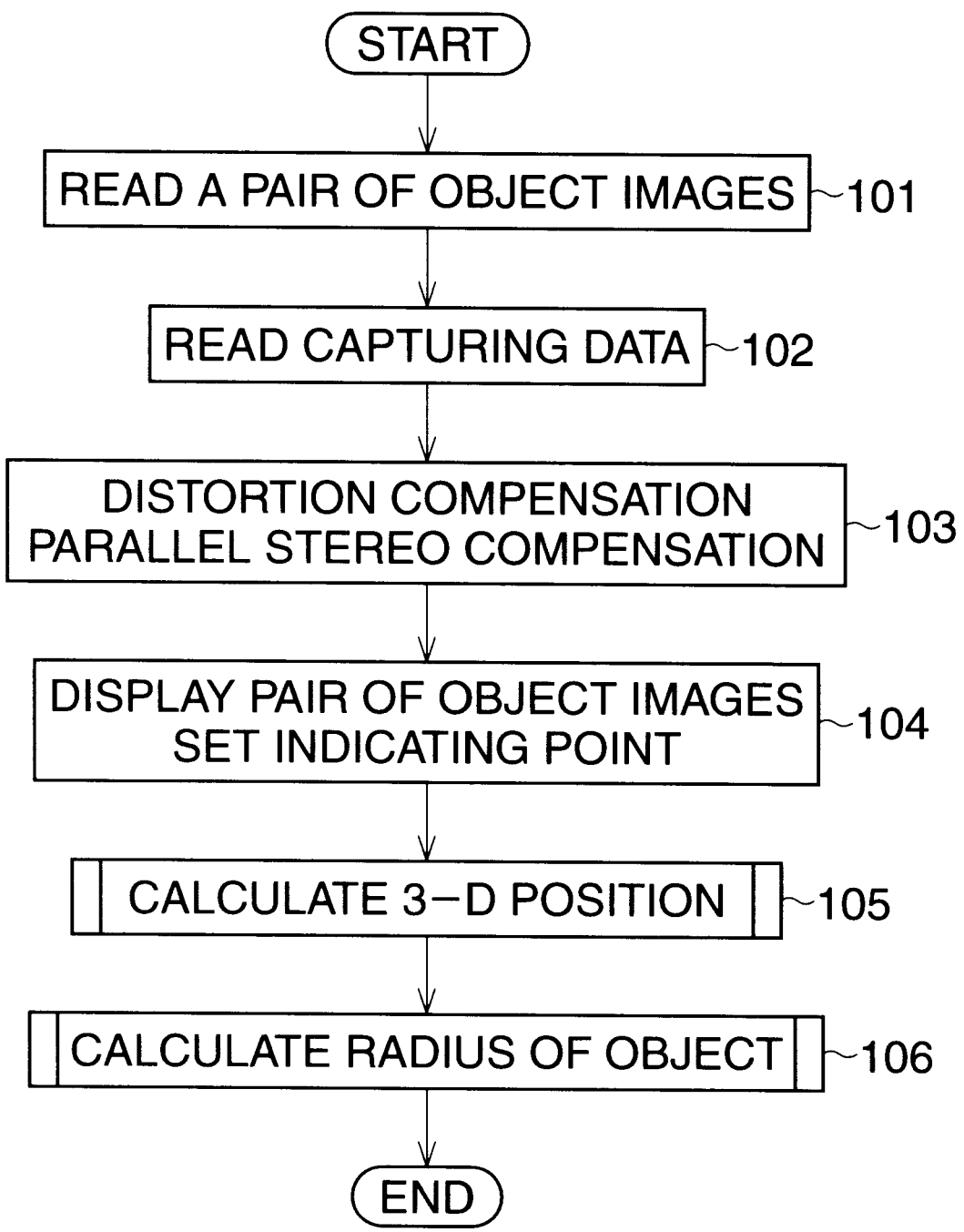
FIG. 4 is a view showing a flowchart of a 3-D information calculating process.
Figure 5:
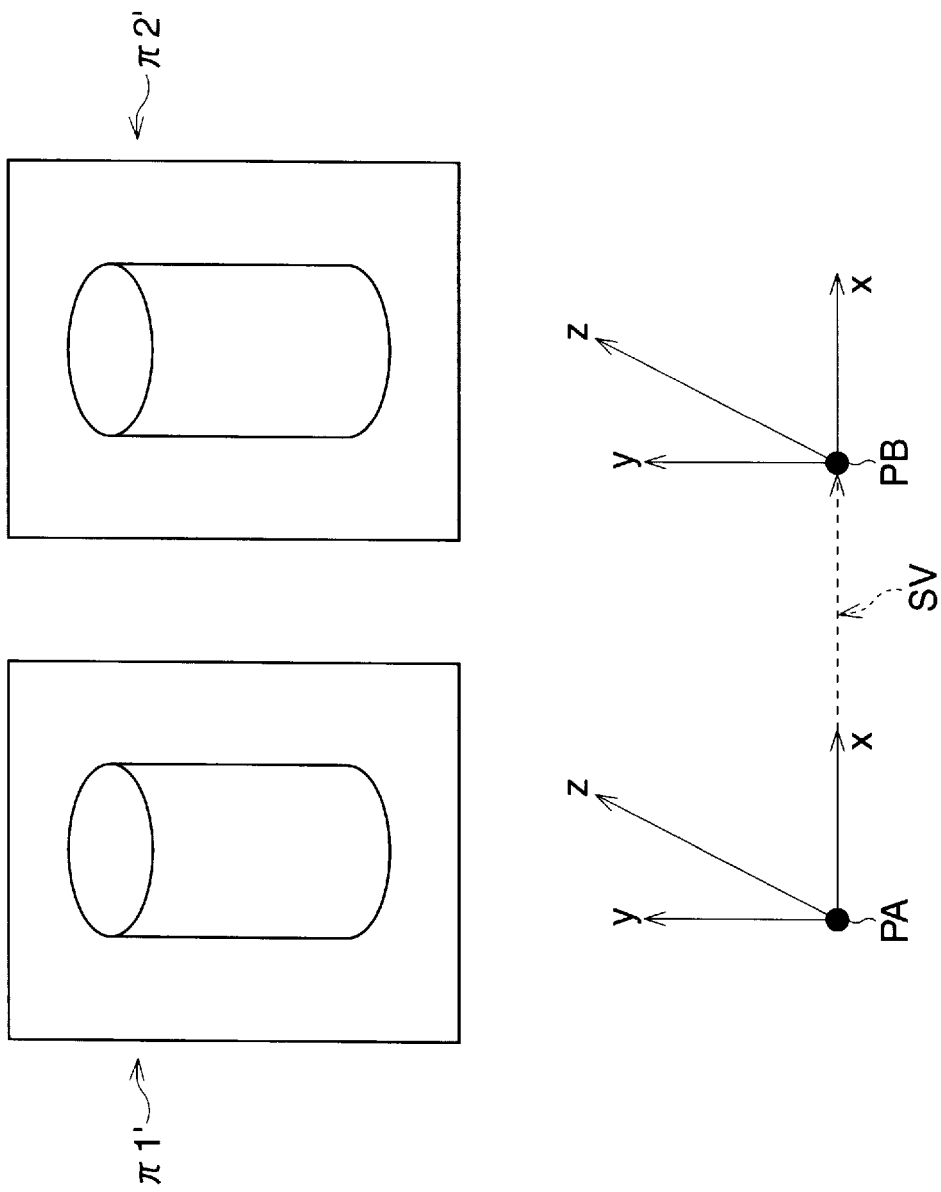
FIG. 5 is a view showing a parallel stereo compensation.
Figure 6:
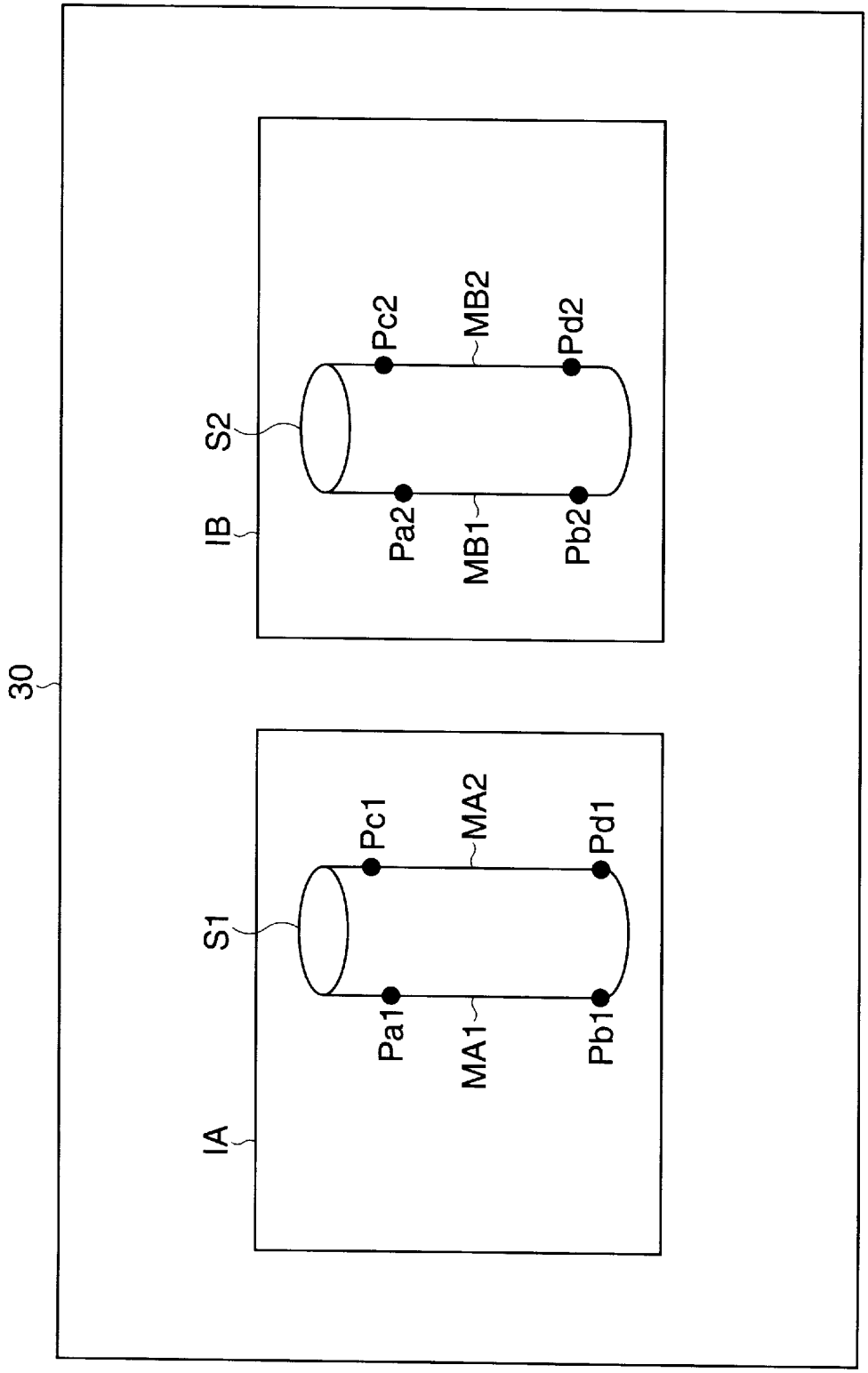
FIG. 6 is view showing a pair of images displayed on a monitor.

FIG. 4 is a view showing a flowchart of a 3-D information calculating process. FIG. 5 is a view showing a compensated pair of images and FIG. 6 is a pair of images displayed on the monitor 30. When the operator performs a given operation on the keyboard 32, the 3-D information calculating process is started.

In Step 101, the pair of captured images is read from the memory card 36 and is temporarily stored in the RAM 18. Then, in Step 102, the capturing data including camera positions and a camera posture is read from the memory card 36.

In Step 103, a distortion compensation and a parallel stereo compensation are performed at the system control circuit 12. The distortion compensation compensates the distortion of the images π1 and π2, which is caused by the characteristics of the lens in the camera 42. In the parallel stereo compensation, an "affine transformation" is performed so that affine-transformed images π1' and π2' are obtained. The geometrical relationship between images π1 and π2 shown in FIG. 3 is changed to a relationship between the images π1' and π2', as shown in FIG. 5. When defining 3-D coordinates (x, y, z) are defined at the capturing points PA and PB, a shift vector "SV" connecting the first capturing point PA and the second capturing point PB coincides with a direction of the x-coordinate in the transformed image π1' and the transformed image π2'. This is different from coordinates-relationship between the images π1, π2 (See FIG. 3). Note that, a revolutionary affine transformation is herein performed, and the distortion compensation and the parallel stereo compensation are well known process.

In Step 104, a pair of images, obtained by performing the distortion compensation and the parallel stereo compensation, is displayed on the monitor 30, as shown in FIG. 6. Hereinafter, an image corresponding to the image π1' (See FIG. 5) is referred to a "first image IA" and an image corresponding to the image π2' is referred to a "second image IB". After the pair of images IA and IB is displayed, the mouse 34 is operated by the operator to input a series of indicating points "Pa1 to Pd1" and "Pa2 to Pd2". For the first image IA, the indicating points Pa1 and Pb1 are set on the occluding contour MA1 and the indicating points Pc1 and Pd1 are set on the occluding contour MA2. Similarly, for the second image IB, the indicating points Pa2 and Pb2 are set on the occluding contour MB1 and indicating points Pc2 and Pd2 are set on the occluding contour MB2. Note that, the indicating points Pa1 and Pc1 and the indicating points Pb1 and Pd1 are a pair respectively and the indicating points Pa2 and Pc2 and the indicating points Pb2 and Pd2 are also a pair respectively. When the indicating points are input by the mouse 34, the positions of the indicating points on the images IA and IB are detected. After Step 104 is performed, the process goes to Step 105.

In Step 105, a position of the object S, namely, the position of the measuring point expressed by 3-D coordinates, is calculated. Then, in Step 106, a radius of the object S is calculated on the basis of the 3-D position.

Figure 7:
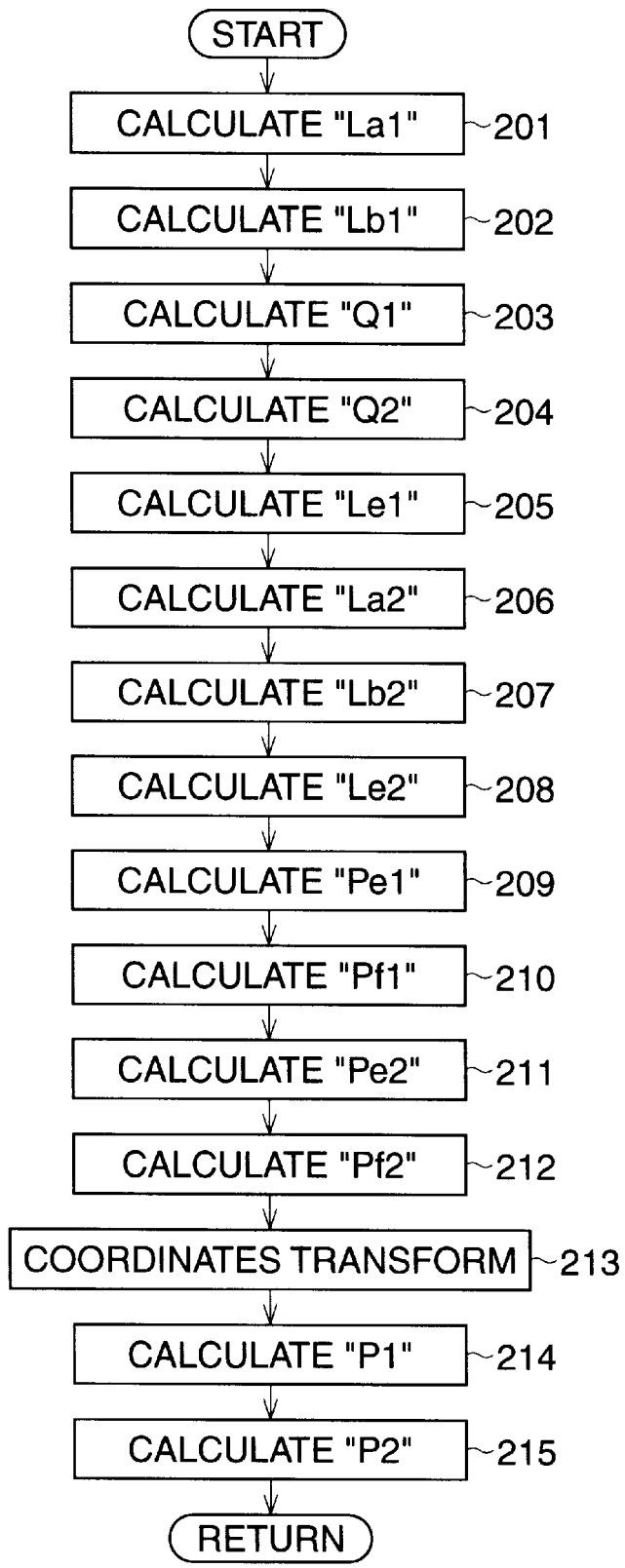
FIG. 7 is a view showing a subroutine of a 3-D position calculating process.
Figure 8:
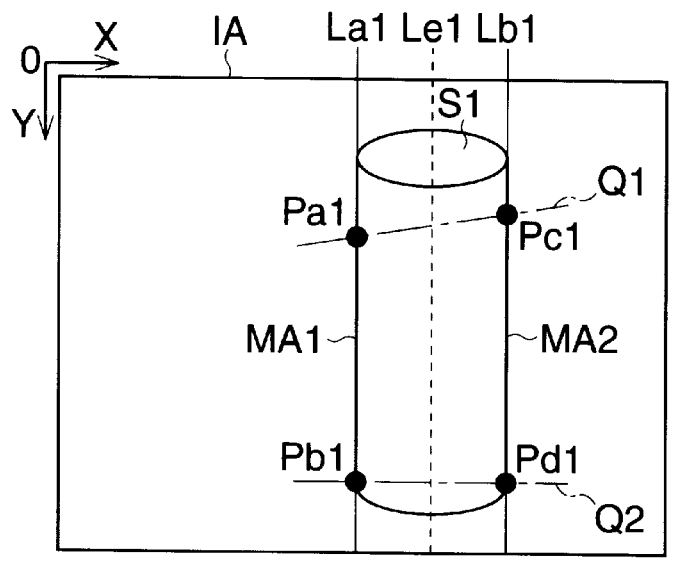
FIG. 8 is a view showing one of the pair of images associated with a bisecting line.
Figure 9:
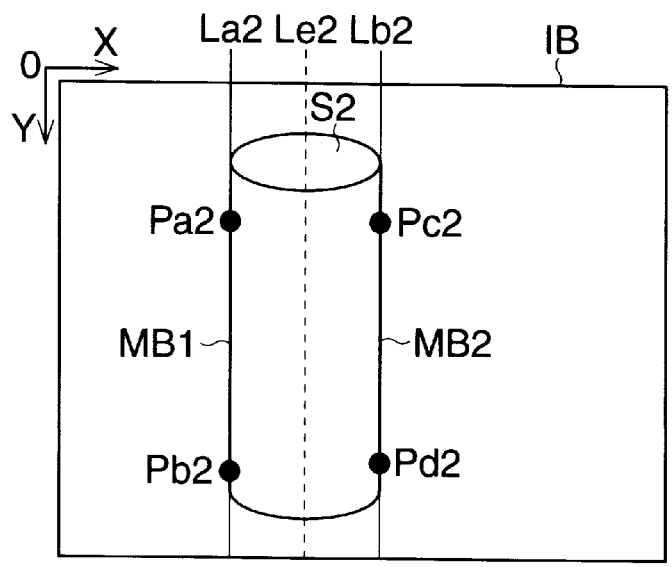
FIG. 9 is a view showing the other of the pair of images associated with a bisecting line.
Figure 10:
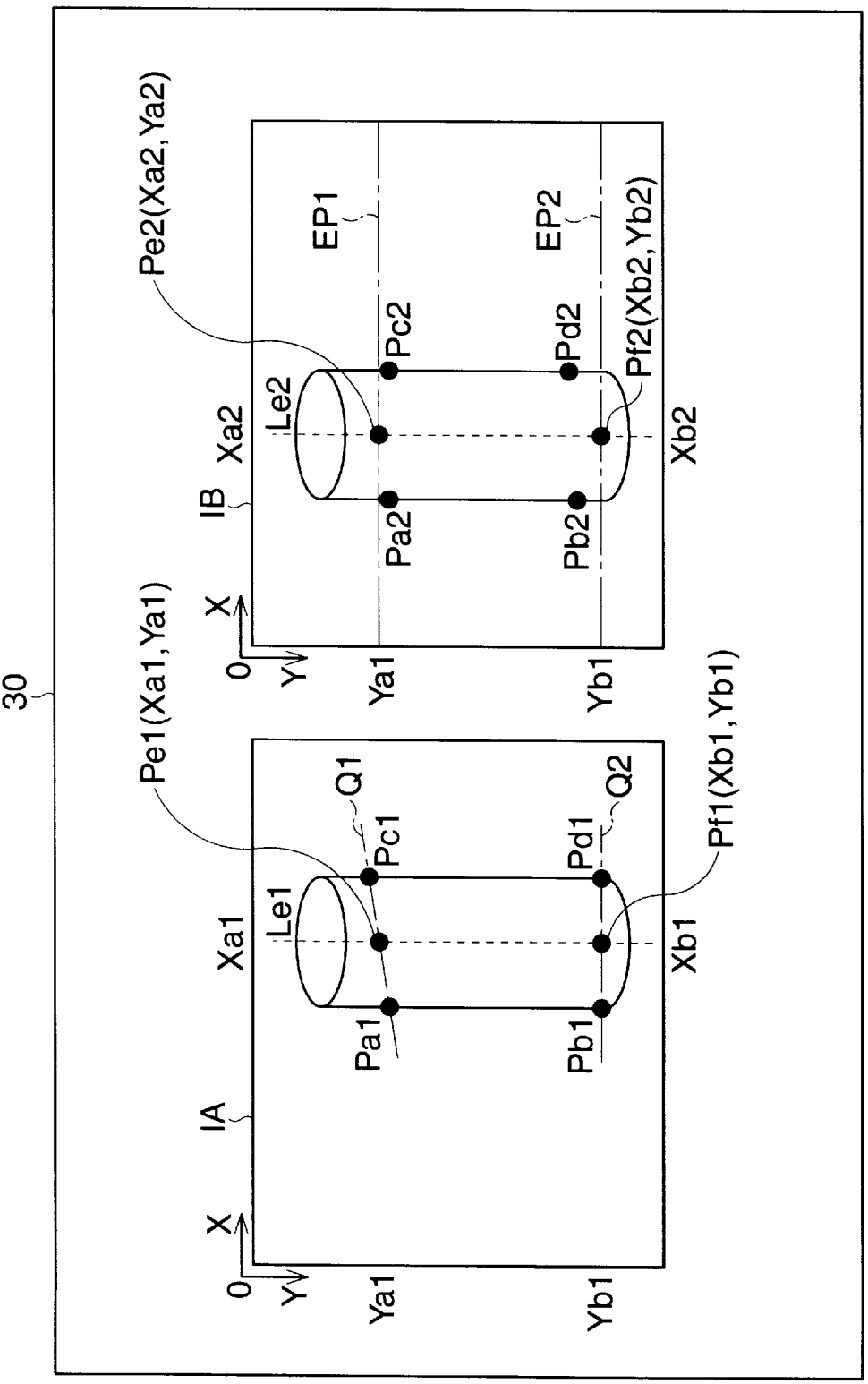
FIG. 10 is a view showing the pair of images associated with a pair of corresponding points.

FIG. 7 is a view showing a subroutine of Step 105 in FIG. 4. FIGS. 8 and 9 are views showing the first image IA and the second image IB, and FIG. 10 is a view showing the pair of images, in which an epipolar line is defined. For each of the first and second images IA and IB, the screen coordinates (X, Y) are defined and the origin is set to a left and upper corner of the first and second images IA and IB respectively. A pixel number of the first and second images IA and IB is "W×H". Note that, the pixel number along the X-coordinate is "W" and the pixel number along the Y-coordinate is "H".

In Step 201, a straight line La1 passing through the indicating points Pa1 and Pb1 is calculated in the first image IA, as shown in FIG. 8. This straight line La1 is on the occluding contour MA1. In Step 202, a straight line Lb1 passing through the indicating points Pc1 and Pd1 is calculated in the first image IA. This straight line Lb1 is on the occluding contour MA2. Note that, the straight lines La1 and Lb1 are expressed by the screen coordinates (X, Y).

In Step 203, a straight line Q1 passing through the indicating points Pa1 and Pc1 is calculated in the first image IA (See FIG. 8). Similarly, In Step 204, a straight line Q2 passing through the indicating points Pb1 and Pd1 is calculated in the first image IA. In Step 205, based on the straight lines La1 and Lb1, a bisecting line Le1 is calculated. As described above, the bisecting line Le1 bisects the object image S1 and corresponds to an imaginary projected image of the central axis SU (See FIG. 3). As the object S is a cylinder, the straight lines La1 and Lb1 are both parallel to the bisecting line Le1, further, a distance from the straight line La1 to the bisecting line Le1 is the same as the distance from the straight line Lb1 to the bisecting line Le1. After Step 205 is performed, the process goes to Step 206.

In Step 206, as shown in FIG. 9, a straight line La2, passing through the indicating points Pa2 and Pb2, is calculated. In Step 207, a straight line Lb2, passing through the indicating points Pc2 and Pd2, is calculated. The straight lines La2 and Lb2 correspond to the occluding contours MB1 and MB2 respectively. Then, In Step 208, a bisecting line Le2, bisecting the object image S2, is obtained on the basis of the straight lines La2 and Lb2. The bisecting line Le2 also bisects the object image S2 and corresponds to an imaginary projected image of the central axis SU, similarly to the bisecting line Le1. After step 208 is performed, the process goes to Step 209.

In Step 209, as shown in FIG. 10, a crossing point Pe1 expressed by coordinates (Xa1, Ya1), on which the straight line Q1 intersects the bisecting line Le1, is calculated. In Step 210, a crossing point Pf1 expressed by coordinates (Xb1, Yb1), on which the straight line Q2 intersects the bisecting line Le1, is calculated. In Step 211, an epipolar line EP1 corresponding to the crossing point Pe1 in the image IA is set in the second image IB, and a crossing point Pe2 expressed by coordinates (Xa2, Ya2), on which the epipolar line EP1 intersects the bisecting line Le2, is calculated. The crossing point Pe1 and the crossing point Pe2 are defined as the pair of corresponding points, which is an imaginary image of a specific point on the central axis SU. Note that, as the parallel stereo compensation is performed at Step 103 (See FIGS. 4 and 5), the epipolar line EP1 is parallel to the coordinate in the image IB and the passes the Y-coordinate "Ya1", which is the Y-coordinate of the crossing point Pe1 in the image IA. After Step 211 is performed, the process goes to Step 212.

In Step 212, an epipolar line EP2, which is parallel to the X-coordinate and passes through the Y-coordinate "Yb1", is set. The Y-coordinate "Yb1" corresponds to the Y-coordinate of the crossing point Pf1 in the image IA. Then, a crossing point Pf2 expressed by coordinates (Xb2, Yb2 (=Yb1)), on which the epipolar line EP2 intersects the bisecting line Le2, is calculated. The pair of the corresponding points composed of the crossing points Pf1 and Pf2 is different from the pair of corresponding points Pe1 and Pe2. When the pair of corresponding points Pe1 and pe2 and the pair of corresponding points Pf1 and Pf2 are calculated, the process goes to Step 213.

In Step 213, a coordinate transform is performed to calculate the 3-D position of the object S by applying the triangulation. Firstly, the coordinates (X, Y) defined on the first and second image IA and IB are transformed to CCD-coordinates (u, v) defined on an image-forming area of the CCD 41, which corresponds to images π1' and π2' shown in FIG. 5. In this transform, a translation for matching the origin position and scale transform are performed so that the pair of corresponding points Pe1 and Pe2 and the pair of corresponding points Pf1 and Pf2 are expressed by the CCD-coordinates (u, v) in place of the screen coordinates (X,Y). The coordinate transform is performed using the following formula (1). The coordinates (Xa1, Ya1), (Xa2, Ya2), (Xb1, Yb1), (Xb2, Yb2) are transformed to the CCD-coordinates (ua1, va1), (ua2, va2), (ub1, vb1), (ub2, vb2), respectively.

$$P' = R \cdot P \qquad (1)$$

Note that, $$R = \begin{bmatrix} -PitchX, & 0, & PitchX \cdot W/2 \\ 0, & PitchY, & -PitchY \cdot H/2 \\ 0, & 0, & F \end{bmatrix}$$

$$P = \begin{bmatrix} X \\ Y \\ 1 \end{bmatrix} \qquad P' = \begin{bmatrix} u \\ v \\ F \end{bmatrix}$$

In the formula (1), the "PitchX" indicates a ratio of a width of the image-forming area to a width of the image IA (or the image IB). The width of the image IA corresponds to the X-direction length. The "PitchY" indicates a ratio of a length of the image-forming area to a length of the image IA (or the image IB) corresponding to the Y-direction length. The "F" indicates a focal length of the camera 42. Note that, the origin point of the CCD-coordinate (u, v) is defined at a central point of the image-forming area. Further, the unit of the CCD-coordinates (u, v) is a millimeter (mm) and the unit of the screen-coordinates (X, Y) is one pixel. As can be seen from the formula (1), a depth direction is treated in the CCD-coordinates, namely, the CCD-coordinates are expressed by 3-D coordinates (u, v and F). When the coordinates of the corresponding points Pe1 and Pe2 and the corresponding points Pf1 and Pf2 are transformed, the process goes to Step 214.

In Step 214, based on the CCD-coordinates (ua1, va1) and (ua2, va2), which correspond to the pair of corresponding points Pe1 and Pe2, and the distance between the first and second capturing points PA and PB, a position of a measuring point "P1" is calculated by following formula. The measuring point P1 is on the central axis SU and the crossing point Pe1 and the crossing point Pe2 are both an imaginary projected image of the measuring point P1. The distance between the first and second capturing points PA and PB is herein represented by "C". The 3-D coordinates (x, y, z) are defined at the first capturing point PA, namely, the original position of the 3-D coordinates (x, y, z) are set to the first capturing point PA.

$$\begin{bmatrix} x \\ y \\ z \end{bmatrix} = \begin{bmatrix} u \cdot C/d \\ v \cdot C/d \\ F \cdot C/d \end{bmatrix} \quad (2)$$

Note that, $$d = \begin{cases} ua1 - ua2 \\ \text{or} \\ ub1 - ub2 \end{cases}$$

The formula (2) is based on the triangulation, and the 3-D coordinates (x1, y1, z1) of the measuring point P1 are obtained by the formula (2). The z-coordinate "z1" of the measuring point P1 indicates a depth from the first capturing point PA. In Step 215, the coordinates (x2, y2, z2) of a measuring point P2 on the central axis SU, corresponding to the pair of corresponding points Pf1 and Pf2, is obtained by the formula (2). The z-coordinate "z2" is the same as the z-coordinate "z1". The two coordinates (x1, y1, z1) and (x2, y2, z2) are displayed on the monitor 30 and temporarily stored in the RAM 18. After Step 215 is performed, this subroutine is terminated and the process returns to Step 105 in FIG. 4.

Note that, while Steps 201 to 205 are performed, Data including the calculated straight line, the crossing point and so on, is temporarily stored and the stored data is read as required.

Figure 11:
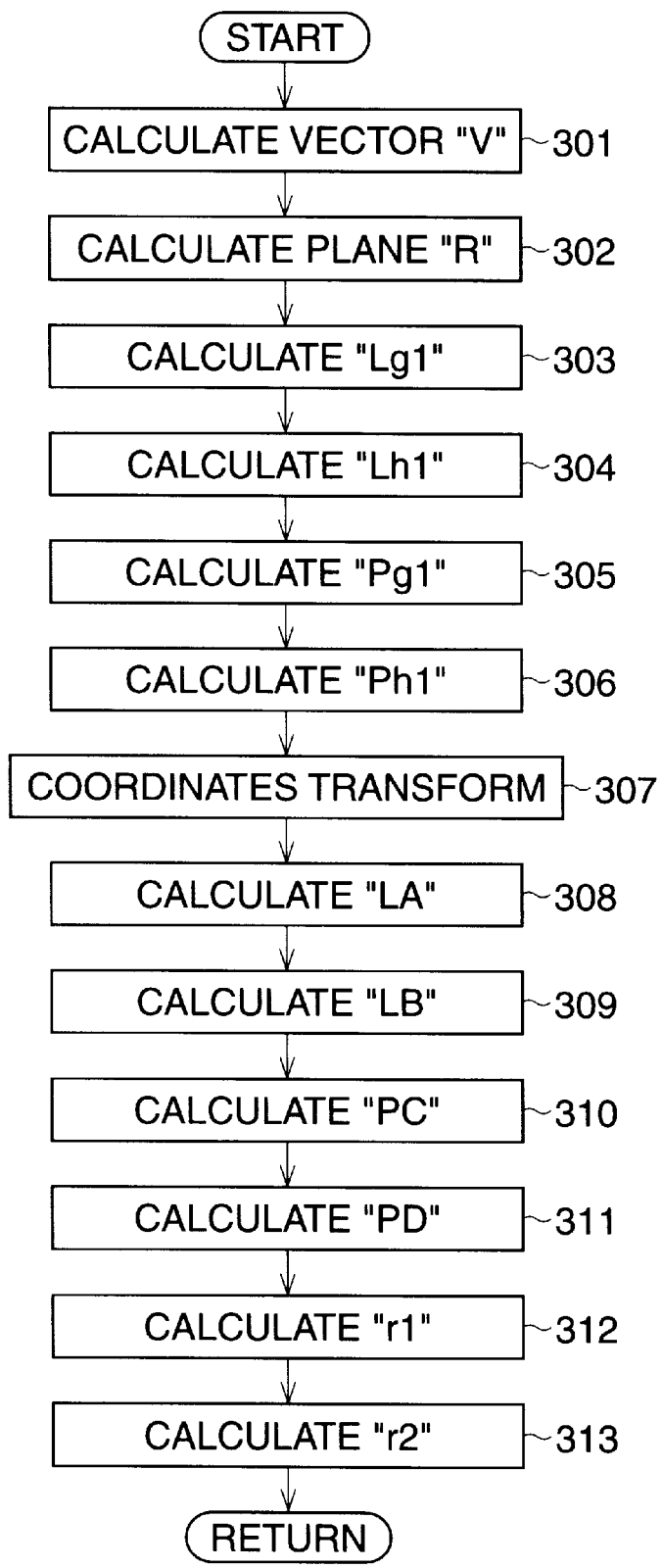
FIG. 11 is a view showing a subroutine of a radius calculating process.
Figure 12:
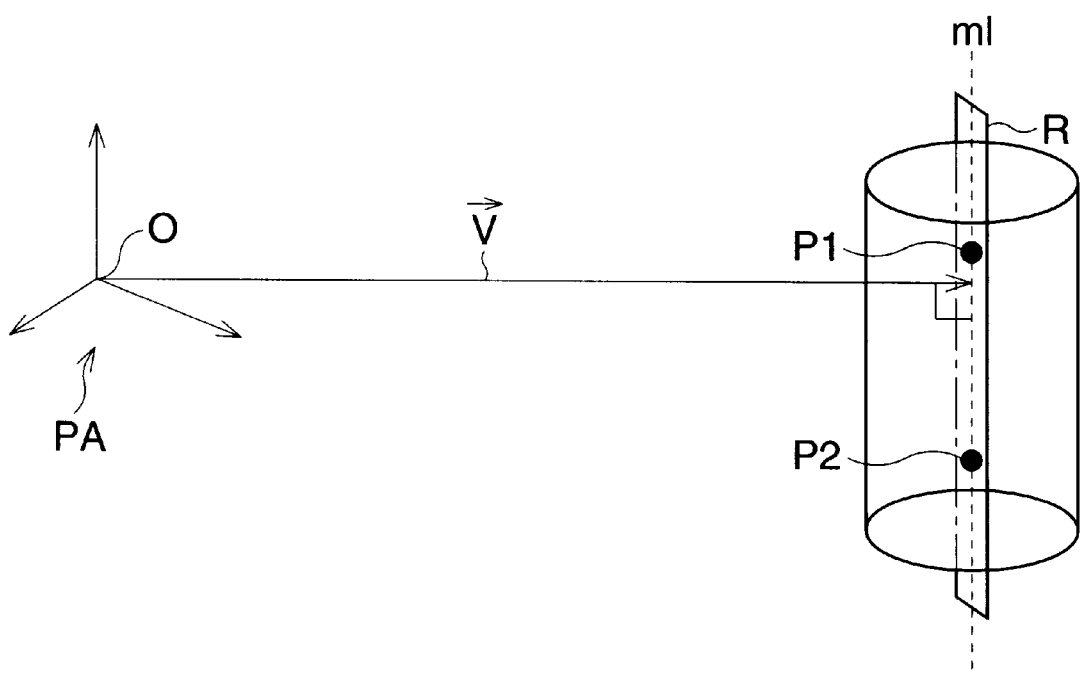
FIG. 12 is a view showing the object and a plane having normal vector.
Figure 13:
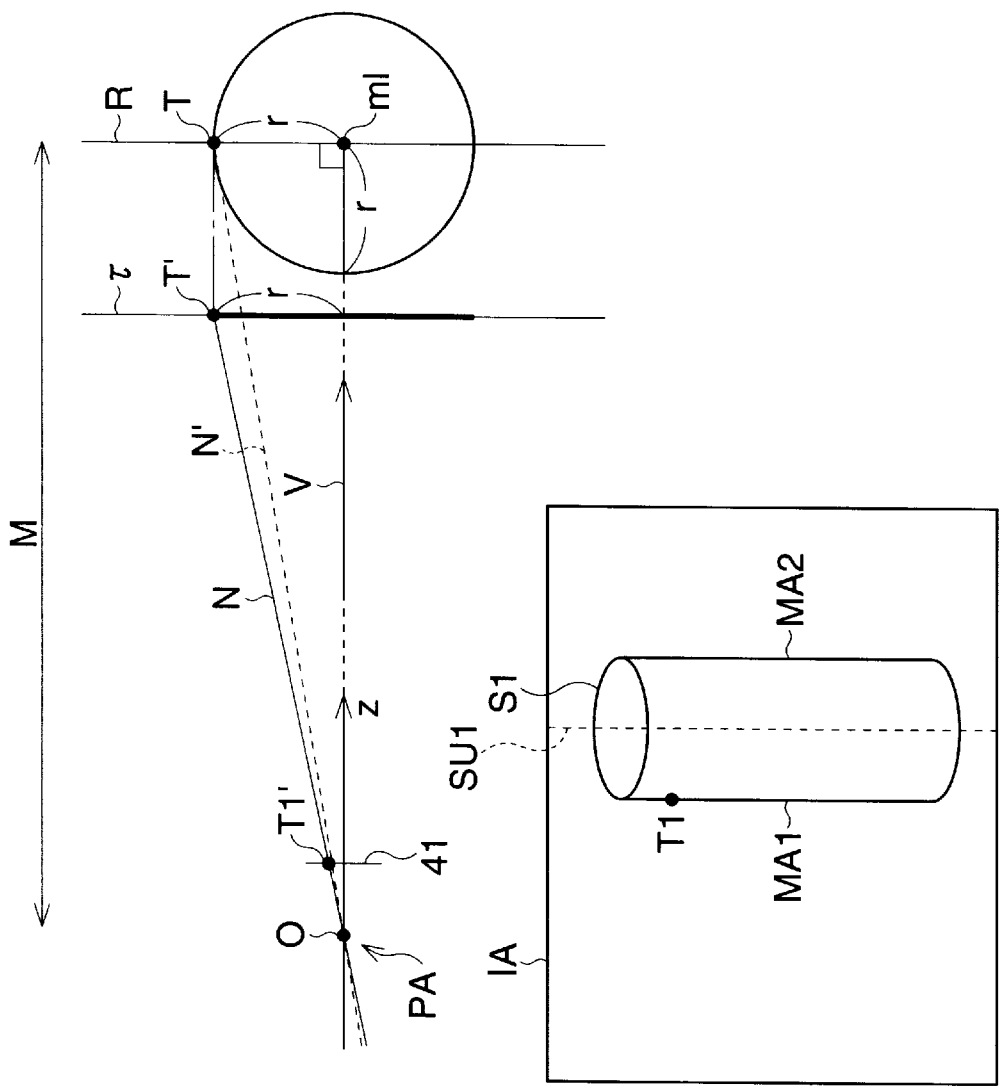
FIG. 13 is a view showing a projected image formed by a weak perspective projection.
Figure 14:
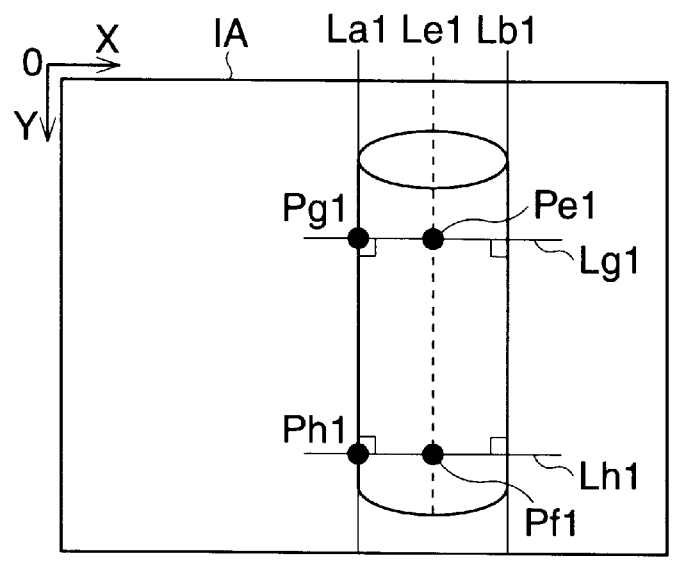
FIG. 14 is a view showing one of the pair of images associated with the radius calculation.

FIG. 11 is a view showing a subroutine of Step 106 in FIG. 4. FIG. 12 is a view showing the object and a plane having a normal vector. FIG. 13 is a view showing a projected image formed by a weak perspective projection. FIG. 14 is a view showing one of the pair of images associated with the radius calculation.

In Step 301 shown in FIG. 11, firstly, a straight line "ml", expressed by the 3-D coordinates (x, y, z), is obtained from the coordinates (x1, y1, z1) and (x2, y2, z2) of the two measuring points P1 and P2. The straight line "ml" is calculated by the following formula.

$$\frac{x}{a} = \frac{y}{b} = \frac{z}{c} \quad (3)$$

Note that, $$(a,b,c) = (x2-x1, y2-y1, z2-z1)$$

Then, as shown in FIG. 12, a vector "V=(e, g, f)" is calculated on the basis of the straight line "ml". The vector "V" is a vector of a line extending from the origin of the 3-D coordinates (x, y, z), namely, the first capturing point PA to the straight line "ml". The vector is perpendicular to the straight line "ml". The vector "V" is calculated by the following formula, which indicates a vertical relationship between the straight line "ml" and the vector "V".

$$(e,f,g) \cdot (a,b,c) = 0 \quad (4)$$

When the vector "V" is obtained, the process goes to Step 302.

In Step 302, a plane "R" is calculated, where the straight line "ml", namely, the central axis SU is included and the vector "V=(e, f, g)" is normal-vector (See FIG. 12). The plane "R" is obtained by the following formula.

$$ex+fy+gz+d=0 \quad (5)$$

Note that, $$d = -(ex1 + fy1 + gz1)$$
$$= -(ex2 + fy2 + gz2)$$

When the plane "R" is calculated, the process goes to Step 303.

In FIG. 13, a relationship between a given point on the plane "R" and on the curved surface of the object S and a given point on the pair of occluding contours MA1 and MA2 in the image IA corresponding to the first capturing point PA, is shown. Herein, a direction of the vector "V" coincides with the depth direction, namely, the z-direction of the 3-D coordinates (x, y, z) for ease of explanation. On the image IA, a point on the contour line MA1 is defined as an "edge point T1". On the image-plane of the CCD 41, an image point T1' corresponding to the edge point T1 is defined. A straight line "N", passing the origin position "O (=PA)" and the image point T1', is further defined.

In this embodiment, a "weak perspective projection" is applied as a projection method. The weak perspective projection is a combination of the orthographic projection and the perspective projection. Firstly, the object S is subjected to the orthographic projection for a plane "τ", which is defined adjacent to the object S. Then, the projected image is subjected to the perspective projection for the origin position "O". Note that, in the case of the weak perspective projection, it is regarded that a distance from the origin position "O" to the object S, represented by "M" in FIG. 13, is much longer than a radius "r" of the object S, in other words, the distance "M" is much longer than a length of the object S along the depth direction (z-direction). As the orthographic projection is performed along an optical axis direction of the camera 42, namely, the normal vector "V", the plane "τ" is parallel to the plane "R".

When the point which is on the surface of the object S and on the plane "R" is defined as an "edge point T" and an image point of the edge point T on the plane "τ" is represented as an image point "T'", the straight line N passes the image point T1' on the image-forming area in the CCD 41 and the image point "T'" on the plane "τ". Based on the characteristic of the weak perspective projection, the straight line N is regarded as a straight line "N'" (shown by broken line), which passes the edge point "T" of the object S. Therefore, when the y-coordinate in the 3-D coordinates (x, y, z) with respect to the edge point "T" is the same as the y-coordinate of the measuring point P1 or P2 of the object S, the radius "r" is obtained by calculating the straight line "N" and the 3-D coordinates of the edge point "T". Accordingly, in this embodiment, the edge point "T" is firstly calculated.

In Step 303, a straight line Lg1, which is perpendicular to the bisecting line Le1 and passes the crossing point Pe1, is calculated in the image IA (See FIG. 14). In Step 304, a straight line Lh1, which is perpendicular to the bisecting line Le1 and passes the crossing point Pf1, is calculated. In Step 305, a screen boundary point Pg1, which is a crossing point of the straight line Lg1 and the straight line La1, is obtained. In Step 306, a screen boundary point Ph1, which is a crossing point of the straight line Lh1 and the straight line La1, is obtained.

In Step 307, the coordinate transform is performed for the crossing points Pg1 and Ph1, similarly to Step 213 in FIG. 7. Namely, the screen coordinates (X, Y) is transformed to the CCD-coordinates (u, v, F). In Step 308, a straight line LA, which passes an image point P'g1 on the image-forming area, corresponding to the screen boundary point Pg1, and passes the origin "O", is calculated. In Step 309, a straight line LB, which passes an image point P'h1 on the image-forming area, corresponding to the screen boundary point Ph1, and passes the origin "O", is calculated. The straight line LA or LB corresponds to the straight line N (N') shown in FIG. 13. When the straight lines LA and LB are obtained, the process goes to Step 310.

In Step 310, an edge point "PC", which is a crossing point of the straight line LA and the object S, and is on the plane "R", is calculated on the basis of the formula (5) and the straight line LA expressed by the 3-D coordinates (x, y, z). In Step 311, an edge point "PD", which is a crossing point of the straight line LB and the object S, and is on the plane "R", is calculated on the basis of the formula (5) and the straight line LB expressed by the 3-D coordinates (x, y, z). The edge points "PC" and "PD" correspond to the edge point "T" shown in FIG. 13. The y-coordinate of the edge points PC and PD coincides with the y-coordinate of the measuring points P1 and P2, respectively.

In Step 312, a distance "r1" from the edge point PC to the measuring point P1 is calculated. In Step 313, a distance "r2" from the edge point PD to the measuring point P2 is calculated. As the object S is the cylinder, the distance "r1" is the same as the distance "r2". The "r1" and "r2" indicate the radius of the object S. When Step 313 is performed, this subroutine is terminated.

Figure 15:
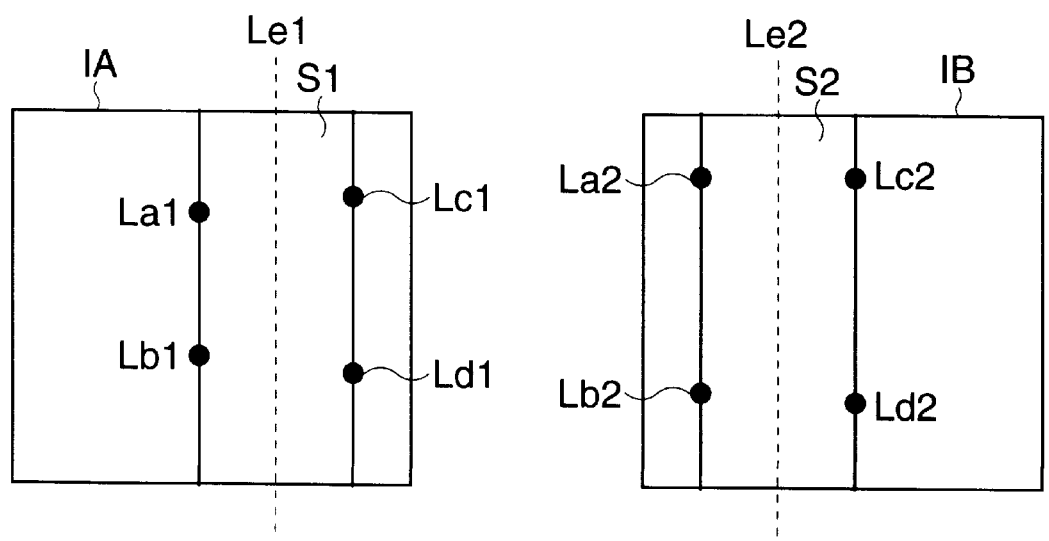
FIG. 15 is a view showing another of the projected images different from the images shown in FIG. 6.
Figure 16:
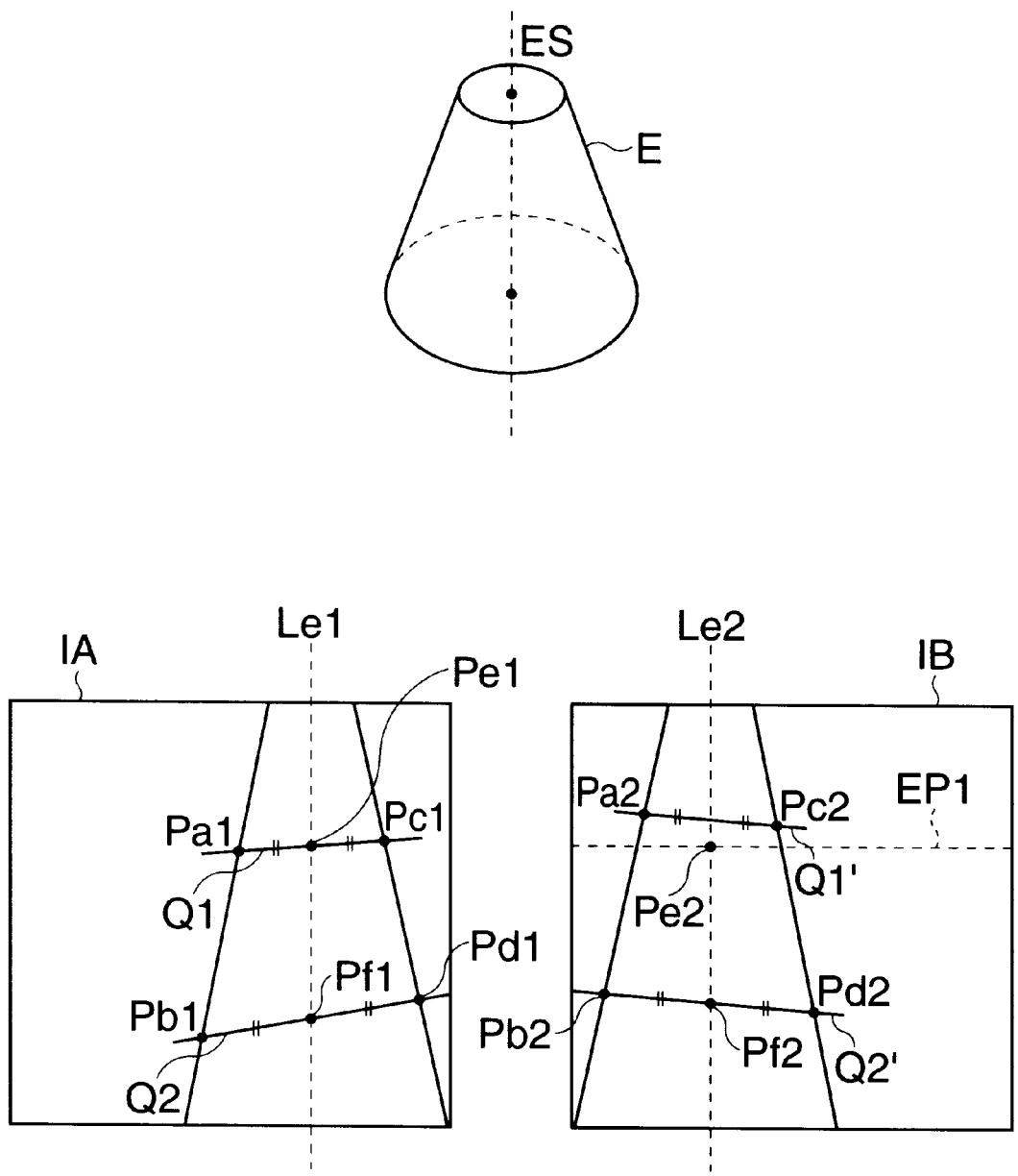
FIG. 16 is a view showing projected images of a frustum.
Figure 17:
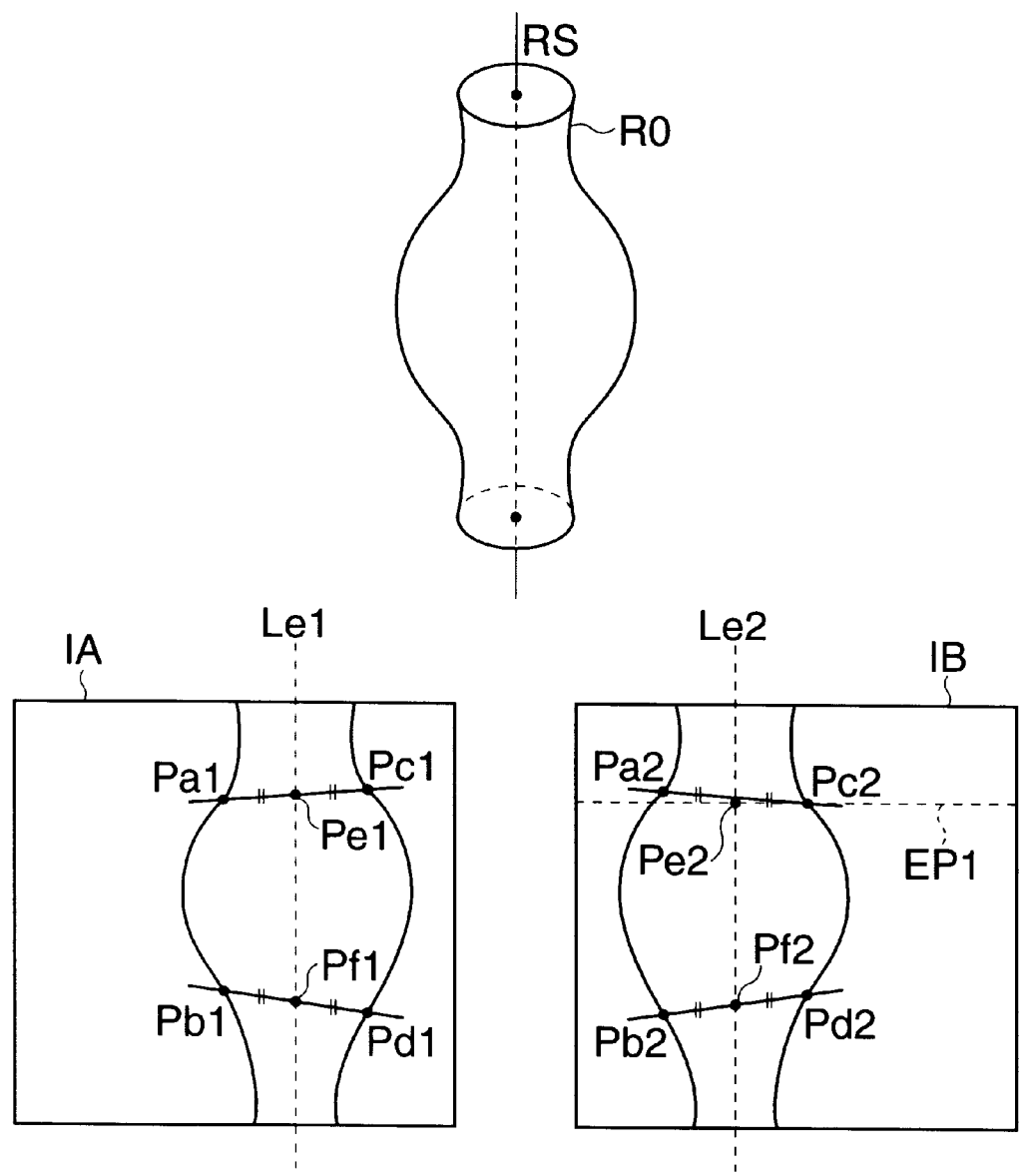
FIG. 17 is a view showing projected images of a body of revolution.

With reference to FIGS. 15 to 17, projected images and a shape of the object will be explained.

FIG. 15 is a view showing another captured images of the object S. When the pair of corresponding points is obtained as described above, the 3-D information can be calculated even if an upper surface or a bottom surface of the object S is not reflected in the captured images.

FIG. 16 is a view showing an object different from the cylinder.

According to the 3-D calculation process described above, 3-D information of a frustum E shown in FIG. 16, which has rotational symmetry with respect to a central axis ES, can be measured. In this case, straight lines Q1 and Q2 are firstly defined, then, a straight line passing a middle point between indicating points Pa1 and Pc1, and passing a middle point between indicating points Pb1 and Pd1, is defined as the bisecting line Le1. In the image IB, straight lines Q1' and Q2' are defined, then, a straight line passing a middle point between indicating points Pa2 and Pc2, and passing a middle point between indicating points Pb2 and Pd2, is defined as the bisecting line Le2. Then, the pair of corresponding points Pe1 and Pe2 is obtained by defining an epipolar line EP1. When the object S is the frustum, the radius corresponding to the pair of corresponding points Pe1 and Pe2 is different from that of the pair of corresponding points Pf1 and Pf2.

FIG. 17 is a view showing an object different from the cylinder and the frustum.

The object RO shown in FIG. 17 is cylindrical having rotational symmetry with respect to a central axis RS. A cross section perpendicular to the central axis RS is a circle. According to the 3-D calculation process described above, 3-D information of the object RO can be also calculated. In this case, the bisecting lines Le1 and Le2 are defined and the pair of corresponding points Pe1 and Pe2 is obtained by defining an epipolar line EP1, similarly to the object E shown in FIG. 16.

In this way, in this embodiment, the positions of the measuring points P1 and P2 are obtained in accordance with the pair of corresponding points Pe1 and Pe2, and the pair of corresponding points Pf1 and Pf2. Further, the radius of the object is calculated on the basis of the measuring points P1 and P2.

Note that, when the radius is not calculated, only the pair of corresponding points Pe1 and Pe2 (or Pf1 and Pf2) may be detected for calculating the position of the measuring point P1 (or P2). Further, one point of the pair of corresponding points "Pe2 (or Pf2)" may be detected without defining the epipolar line EP1. In this case, the point on the bisecting line Le2, the Y-coordinate of which is the same as that of the corresponding point Pe1 (or Pf1) is defined as the corresponding point Pe2 (or Pf2).

The pair of corresponding points Pe1 (Pe2) may be detected without the input-operation using the monitor 30 and the mouse 34. Namely, the pair of corresponding points is automatically calculated. In this case, the pair of occluding contours MA1 and MA2 and the pair of occluding contours MB1, MB2 are detected by a line detecting process, such as an edge detecting process, without displaying the pair of images IA and IB and then the pair of corresponding points is detected.

In this embodiment, a measurement of the 3-D information using the stereo method is applied for the photogrammetry, however, the measurement may be applied to a "computer vision". In this case, two still or movie cameras are prepared and an object is captured from two directions by two cameras. Then, the 3-D information of the object is calculated from the pair of images.

In this embodiment, the parallel stereo compensation is performed, however, the positions of the measuring points may be calculated without the parallel stereo compensation. In this case, an epipolar line different from the epipolar line EP1 shown in FIG. 10 is defined.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. P2000-218608 (filed on Jul. 19, 2000) which is expressly incorporated herein, by reference, in its entirety.

What is claimed is:

1. An apparatus for measuring three-dimension information of an object comprising:

an image reader that reads a pair of images recorded in a recording medium, the pair of images being obtained by capturing the object from two capturing points, the object being cylindrical, a pair of occluding contours being reflected in each of the pair of images;

a corresponding point detector that detects at least one pair of corresponding points, which is an imaginary pair of images of at least one measuring point positioned on a central axis of the object, on a pair of bisecting lines defined in the pair of images, each of the pair of bisecting lines being an imaginary projected image of the central axis; and a three-dimension information calculator that calculates a three-dimension position of said at least one measuring point on the basis of said at least one pair of corresponding points by applying a triangulation method.

2. The apparatus of claim 1, wherein an exclusive digital still camera with an image sensor for photogrammetry is used and the camera is arranged at two capturing positions in order to obtain the pair of images.

3. The apparatus of claim 1, wherein the corresponding point detector defines at least one first image point on one of the pair of bisecting lines in one of the pair of images, and sets at least one epipolar line corresponding to the at least one first image point in the other of the pair of images, and defines at least one second image point, which is a crossing point of the other of the pair of bisecting lines and the at least one epipolar line, the at least one first image point and the at least one second image point being defined as said at least one pair of corresponding points.

4. The apparatus of claim 1, further comprising:

a display for displaying the pair of images, said pair of images being displayed when the pair of images is read from the recording medium; and an indicating point inputting device for inputting two pairs of indicating points on the pair of occluding contours in each of the pair of images, wherein said corresponding point detector detects the two pairs of indicating points input by an operator, and calculates the pair of bisecting lines and said at least one pair of corresponding points in accordance with the two pairs of indicating points in each of the pair of images.

5. The apparatus of claim 1, further comprising a radius calculator that calculates a radius of the object, wherein said corresponding point detector detects two pairs of corresponding points and said three-dimension information calculator calculates three-dimension positions of two measuring points, and wherein said radius calculator 1) calculates a plane, in which a vector perpendicular to the central axis and passing one of the two capturing points is a normal vector and the central axis is included, from the positions of the two measuring points, 2) calculates an edge point on said plane and a curved surface of the object, in which a position along the central axis coincides with that of one of the two measuring points, on the basis of an image point, which is on one of the pair of occluding contours and corresponds to the edge point, and 3) calculates the radius from one of the two measuring points and the edge point.

6. A method for measuring three-dimension information of an object comprising steps of:

reading a pair of images recorded in a recording medium, the pair of images being obtained by capturing the object from two capturing points, the object being cylindrical, a pair of occluding contours being reflected in each of the pair of images;

detecting at least one pair of corresponding points, which is an imaginary pair of images of at least one measuring point positioned on a central axis of the object, on a pair of bisecting lines defined in the pair of images, each of the pair of bisecting lines being an imaginary projected image of the central axis; and calculating a three-dimension position of said at least one measuring point on the basis of said at least one pair of corresponding points by applying a triangulation method.

7. A memory medium that stores a program for measuring three-dimension information of an object, said program comprising steps of:

reading a pair of images recorded in a recording medium, the pair of images being obtained by capturing the object from two capturing points, the object being cylindrical, a pair of occluding contours being reflected in each of the pair of images;

detecting at least one pair of corresponding points, which is an imaginary pair of images of at least one measuring point positioned on a central axis of the object, on a pair of bisecting lines defined in the pair of images, each of the pair of bisecting lines being an imaginary projected image of the central axis; and calculating a three-dimension position of said at least one measuring point on the basis of said at least one pair of corresponding points by applying a triangulation method.

* * * * *